United States Patent
Bhushan et al.

(10) Patent No.: US 9,326,253 B2
(45) Date of Patent: Apr. 26, 2016

(54) WIRELESS COMMUNICATION CHANNEL BLANKING

(75) Inventors: Naga Bhushan, San Diego, CA (US); Aamod Khandekar, San Deigo, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2359 days.

(21) Appl. No.: 12/163,835

(22) Filed: Jun. 27, 2008

(65) Prior Publication Data
US 2009/0130979 A1 May 21, 2009

Related U.S. Application Data

(60) Provisional application No. 60/988,356, filed on Nov. 15, 2007.

(51) Int. Cl.
*H04W 52/00* (2009.01)
*H04W 52/24* (2009.01)
*H04W 52/32* (2009.01)
*H04W 52/44* (2009.01)
*H04W 52/38* (2009.01)

(52) U.S. Cl.
CPC .......... *H04W 52/243* (2013.01); *H04W 52/325* (2013.01); *H04W 52/38* (2013.01); *H04W 52/44* (2013.01)

(58) Field of Classification Search
USPC ....... 455/223, 454, 63.1, 114.2, 296
See application file for complete search history.

(56) References Cited

U.S. PATENT DOCUMENTS

| 5,825,758 | A | * | 10/1998 | Heikkinen et al. | ............ 370/330 |
| 5,828,962 | A | | 10/1998 | Ho-A-Chuck | |
| 5,867,478 | A | | 2/1999 | Baum et al. | |
| 5,920,862 | A | | 7/1999 | Waters | |

(Continued)

FOREIGN PATENT DOCUMENTS

| CN | 1219081 A | 6/1999 |
| CN | 1235745 | 11/1999 |

(Continued)

OTHER PUBLICATIONS

3GPP TS 36.211 V 8.2.0 (Mar. 2008) "3rd Generation Partnership Project; Technical Specification Group Radio Access Network; Evolved Universal Terrestrial Radio Access (E-UTRA); Physical Channels and Modulation (Release 8)" Internet, Citation, Mar. 2008 (Mar. 2008), pp. 1-65, sections 6-6.2.4 and 6.10 to 6.10.3.2 XP002537575.

(Continued)

*Primary Examiner* — Wen Huang
(74) *Attorney, Agent, or Firm* — Ashish L. Patel

(57) ABSTRACT

Systems and methodologies are described that facilitate blanking on portions of bandwidth utilized by communicating devices that are dominantly interfered by a disparate device in wireless communications networks. The portions of bandwidth can relate to critical data, such as control data, and one or more of the communicating devices can request that the dominantly interfering device blank on one or more of the portions. The communicating devices can subsequently transmit data over the blanked portions free of the dominant interference. Additionally, the dominantly interfering device can request reciprocal blanking from the one or more communicating devices.

53 Claims, 11 Drawing Sheets

(56) References Cited

U.S. PATENT DOCUMENTS

| | | | |
|---|---|---|---|
| 5,940,765 A | 8/1999 | Haartsen | |
| 5,970,414 A | 10/1999 | Bi et al. | |
| 6,337,988 B1 | 1/2002 | Agin et al. | |
| 6,473,619 B1 | 10/2002 | Kong et al. | |
| 6,498,932 B1* | 12/2002 | Silventoinen et al. | 455/424 |
| 6,728,550 B1* | 4/2004 | Bohnke et al. | 455/522 |
| 6,795,419 B2 | 9/2004 | Parantainen et al. | |
| 7,302,276 B2 | 11/2007 | Bernhardsson et al. | |
| 7,426,395 B2 | 9/2008 | Stephens | |
| 7,450,559 B2 | 11/2008 | Schotten et al. | |
| 7,453,912 B2 | 11/2008 | Laroia et al. | |
| 7,522,919 B2 | 4/2009 | Yoon et al. | |
| 7,555,300 B2* | 6/2009 | Scheinert et al. | 455/450 |
| 7,657,277 B2 | 2/2010 | Montojo et al. | |
| 7,751,510 B2 | 7/2010 | Budianu et al. | |
| 7,796,639 B2 | 9/2010 | Buckley et al. | |
| 7,830,907 B1 | 11/2010 | Petranovich et al. | |
| 7,920,494 B2 | 4/2011 | Stewart et al. | |
| 8,077,649 B2 | 12/2011 | Cai | |
| 8,077,801 B2 | 12/2011 | Malladi | |
| 2001/0001609 A1* | 5/2001 | Mikuni et al. | 370/337 |
| 2001/0014608 A1* | 8/2001 | Backstrom et al. | 455/450 |
| 2002/0168994 A1* | 11/2002 | Terry et al. | 455/522 |
| 2003/0101404 A1 | 5/2003 | Zhao et al. | |
| 2003/0119452 A1 | 6/2003 | Kim et al. | |
| 2004/0022176 A1 | 2/2004 | Hashimoto et al. | |
| 2004/0190482 A1* | 9/2004 | Baum et al. | 370/347 |
| 2004/0198235 A1* | 10/2004 | Sano | 455/69 |
| 2004/0203734 A1 | 10/2004 | Ishii | |
| 2005/0163070 A1* | 7/2005 | Farnham et al. | 370/328 |
| 2005/0254555 A1* | 11/2005 | Teague | 375/136 |
| 2005/0277425 A1* | 12/2005 | Niemela et al. | 455/452.2 |
| 2006/0045050 A1 | 3/2006 | Floros et al. | |
| 2006/0111137 A1* | 5/2006 | Mori et al. | 455/522 |
| 2006/0281476 A1 | 12/2006 | Lane et al. | |
| 2006/0286995 A1 | 12/2006 | Onggosanusi et al. | |
| 2007/0021075 A1 | 1/2007 | Nakao | |
| 2007/0036066 A1 | 2/2007 | Thomas et al. | |
| 2007/0047483 A1 | 3/2007 | Khan | |
| 2007/0070967 A1 | 3/2007 | Yang et al. | |
| 2007/0082619 A1* | 4/2007 | Zhang et al. | 455/69 |
| 2007/0086420 A1 | 4/2007 | Schotten et al. | |
| 2007/0104151 A1 | 5/2007 | Papasakellariou et al. | |
| 2007/0167160 A1* | 7/2007 | Asanuma et al. | 455/434 |
| 2007/0189244 A1 | 8/2007 | Del Prado Pavon et al. | |
| 2007/0195899 A1 | 8/2007 | Bhushan et al. | |
| 2007/0202913 A1 | 8/2007 | Ban | |
| 2007/0242618 A1 | 10/2007 | Sakoda et al. | |
| 2007/0248113 A1 | 10/2007 | Ko et al. | |
| 2007/0253442 A1 | 11/2007 | Yu et al. | |
| 2007/0258357 A1 | 11/2007 | Akita | |
| 2007/0275746 A1 | 11/2007 | Bitran | |
| 2008/0031307 A1 | 2/2008 | Fukuoka et al. | |
| 2008/0032744 A1 | 2/2008 | Khan et al. | |
| 2008/0049690 A1 | 2/2008 | Kuchibhotla et al. | |
| 2008/0056201 A1 | 3/2008 | Bennett | |
| 2008/0081598 A1 | 4/2008 | Chandra et al. | |
| 2008/0095133 A1* | 4/2008 | Kodo et al. | 370/342 |
| 2008/0130612 A1 | 6/2008 | Gorokhov et al. | |
| 2008/0132263 A1 | 6/2008 | Yu et al. | |
| 2008/0144612 A1 | 6/2008 | Honkasalo et al. | |
| 2008/0232396 A1 | 9/2008 | Buckley et al. | |
| 2009/0052403 A1* | 2/2009 | Hokao | 370/335 |
| 2009/0080382 A1 | 3/2009 | Chen et al. | |
| 2009/0097447 A1 | 4/2009 | Han et al. | |
| 2009/0129268 A1 | 5/2009 | Lin et al. | |
| 2009/0131061 A1 | 5/2009 | Palanki et al. | |
| 2009/0132674 A1 | 5/2009 | Horn et al. | |
| 2009/0132675 A1 | 5/2009 | Horn et al. | |
| 2009/0149187 A1 | 6/2009 | Miki et al. | |
| 2009/0185632 A1 | 7/2009 | Cai et al. | |
| 2009/0199069 A1 | 8/2009 | Palanki et al. | |
| 2009/0219838 A1 | 9/2009 | Jia et al. | |
| 2009/0219839 A1 | 9/2009 | Zhao et al. | |
| 2009/0252077 A1 | 10/2009 | Khandekar et al. | |
| 2009/0257388 A1 | 10/2009 | Khandekar et al. | |
| 2009/0316654 A1 | 12/2009 | Prakash et al. | |
| 2009/0316655 A1 | 12/2009 | Prakash et al. | |
| 2010/0009687 A1 | 1/2010 | Koivisto et al. | |
| 2010/0014286 A1 | 1/2010 | Yoneda et al. | |
| 2010/0040019 A1 | 2/2010 | Tinnakornsrisuphap et al. | |
| 2010/0040038 A1 | 2/2010 | Tinnakornsrisuphap et al. | |
| 2010/0062783 A1 | 3/2010 | Luo et al. | |
| 2010/0091702 A1 | 4/2010 | Luo et al. | |
| 2010/0097972 A1 | 4/2010 | Parkvall et al. | |
| 2010/0201188 A1 | 8/2010 | Robbins | |
| 2010/0329171 A1 | 12/2010 | Kuo et al. | |
| 2011/0103286 A1 | 5/2011 | Montojo et al. | |
| 2011/0103338 A1 | 5/2011 | Astely et al. | |
| 2011/0235744 A1 | 9/2011 | Ketchum et al. | |

FOREIGN PATENT DOCUMENTS

| | | |
|---|---|---|
| CN | 1685647 A | 10/2005 |
| CN | 1770892 A | 5/2006 |
| CN | 1909417 A | 2/2007 |
| CN | 1998146 A | 7/2007 |
| CN | 101094433 A | 12/2007 |
| EP | 0917305 A2 | 5/1999 |
| EP | 1061705 A1 | 12/2000 |
| EP | 1420551 A2 | 5/2004 |
| EP | 1440532 | 7/2004 |
| EP | 1501328 A2 | 1/2005 |
| EP | 1679814 A2 | 7/2006 |
| JP | 11098571 A | 4/1999 |
| JP | 2004260692 A | 9/2004 |
| JP | 2004274745 A | 9/2004 |
| JP | 2005510902 | 4/2005 |
| JP | 2006505978 A | 2/2006 |
| JP | 2006135673 A | 5/2006 |
| JP | 2006311465 A | 11/2006 |
| JP | 2007053438 A | 3/2007 |
| JP | 2007097173 A | 4/2007 |
| JP | 2007129726 A | 5/2007 |
| JP | 2007515106 A | 6/2007 |
| JP | 2007221745 A | 8/2007 |
| JP | 2007251855 A | 9/2007 |
| JP | 2007527678 A | 9/2007 |
| JP | 2007529915 A | 10/2007 |
| JP | 2007300453 A | 11/2007 |
| JP | 2007533255 | 11/2007 |
| JP | 2007335913 A | 12/2007 |
| JP | 2007538462 T | 12/2007 |
| JP | 2008053858 A | 3/2008 |
| JP | 2008219637 A | 9/2008 |
| JP | 2008288736 A | 11/2008 |
| JP | 2008547269 A | 12/2008 |
| JP | 2009510975 A | 3/2009 |
| JP | 2009246501 A | 10/2009 |
| JP | 2009538584 A | 11/2009 |
| KR | 20070009707 A | 1/2007 |
| RU | 2150176 | 5/2000 |
| RU | 2165678 C2 | 4/2001 |
| RU | 2216103 C2 | 11/2003 |
| RU | 2002129901 A | 3/2004 |
| RU | 2236757 C2 | 9/2004 |
| RU | 2262811 | 10/2005 |
| RU | 2287902 C2 | 11/2006 |
| RU | 2307481 C2 | 9/2007 |
| TW | 200404467 | 3/2004 |
| TW | 200404472 | 3/2004 |
| WO | WO96016524 | 5/1996 |
| WO | 9809469 A1 | 3/1998 |
| WO | 0013426 A2 | 3/2000 |
| WO | WO0135692 A1 | 5/2001 |
| WO | WO0178440 | 10/2001 |
| WO | WO03039057 | 5/2003 |
| WO | 03101141 A1 | 12/2003 |
| WO | WO2004019537 A2 | 5/2004 |
| WO | WO-2004043096 A2 | 5/2004 |
| WO | 2005062798 A2 | 7/2005 |
| WO | WO-2005088873 A1 | 9/2005 |
| WO | WO2005109657 A1 | 11/2005 |
| WO | WO2005117283 A2 | 12/2005 |

(56) References Cited

FOREIGN PATENT DOCUMENTS

| WO | WO2006001143 A1 | 1/2006 |
| WO | WO2006007318 A1 | 1/2006 |
| WO | WO2006020032 | 2/2006 |
| WO | WO2006038694 A1 | 4/2006 |
| WO | WO2006043588 A1 | 4/2006 |
| WO | WO2006086437 A1 | 8/2006 |
| WO | WO2006106676 A1 | 10/2006 |
| WO | WO2006134032 | 12/2006 |
| WO | WO2006138336 A1 | 12/2006 |
| WO | 2007012635 | 2/2007 |
| WO | WO2007024853 | 3/2007 |
| WO | WO2007024895 | 3/2007 |
| WO | WO2007025308 | 3/2007 |
| WO | WO2007044173 A2 | 4/2007 |
| WO | WO2007044281 | 4/2007 |
| WO | WO2007081130 A1 | 7/2007 |
| WO | WO2007091245 A2 | 8/2007 |
| WO | WO2007106980 | 9/2007 |
| WO | WO-2007119452 A1 | 10/2007 |
| WO | WO2007137201 | 11/2007 |
| WO | WO2007137920 A1 | 12/2007 |
| WO | 2008023928 A2 | 2/2008 |
| WO | WO2008049136 | 4/2008 |
| WO | WO2008086149 | 7/2008 |

OTHER PUBLICATIONS

Hooli K et al: "Flexible Spectrum Use between Winner Radio Access Networks" Proc. IST Mobile & Wireless, Myconos (Greece),, Jun. 4, 2006, pp. 1-5, XP003020776 p. 1, paragraph 1, p. 2, paragraph 2.

International Search Report and Written Opinion—PCT/US2008/080220, International Search Authority—European Patent Office—Jun. 26, 2009.

LG Electronics: "Multiplexing of MBMS and unicast transmission in E-UTRA downlink; R1-060054" 3GPP TSG-RAN WG1 Meeting AD HOC LTE, vol. R1-060054, Jan. 23, 2006, pp. 1-5, XP003016637. Meeting ID 25490.

NTT Docomo et al., "L1/L2 Control Channel Structure for E-UTRA Downlink," 3GPP TSG RAN WG1 Meeting 45, R1-061181, Shanghai, China, May 8-12, 2006, pp. 1-17.

NTT Docomo et al., "PUCCH Structure Considering Sounding RS Transmission in E-UTRA Uplink," 3GPP TSG RAN WG1 Meeting #50, R1-073700, Athens, Greece, Aug. 20-24, 2007, pp. 1-3.

Qualcomm Europe: "Neighbor Cell Search—Analysis and Simulations" 3GPP Draft; R1-063432, 3rd Generation Partnership Project (36PP), Mobile Competence Centre ; 650, Route Des Lucioles ; F-06921 Sophia-Antipolis Cedex ; France, no. Riga, Latvia; Nov. 6, 2006, Nov. 1, 2006, XP050103869 paragraph [04.1]—paragraph [04.3].

"High Performance Space Frequency Interleaved MIMO-OFDM Eigen mode Transmission systems," Vehicular Technology Conference, 2006, VTC-2006 IEEE 64th, Sep. 25-28, 2006, pp. 1-5.

Ravi Palanki "Update on out-of-band pilot design for LBC FDD." ftp://ftp.3gpo2.org/TSGC/Working/2006/2006-12-Mau/TSG-C-2006-12-Maui/WG3/C30-band_pilot_design_for_LBC_FDD. pdf.Dec. 2006.

Taiwan Search Report—TW097140495—TIPO—Apr. 17, 2012.

3rd Generation Partnership Project; Technical Specification Group Radio Access Network; Multiplexing and channel coding (FDD); 3GPP TS 25.212 V5.10.0 (Jun. 2005) Release 5.

NEC Group: "Some issues related to MBSFN sub-frame structure", R1-071501, RAN WG1 meeting 48bis, Mar. 30, 2007,http://www.3gpp.org/ftp/tsg_ran/WG1_RL1/TSGR1_48b/Docs/R1-071501.zip.

LG Electronics: "DL PDCCH/PCFICH/RS transmission in MBSFN subframe," R1-073477, 3GPP TSG RAN WG1 #50,7.2.3, Aug. 20-24, 2007, pp. 2.

Nokia et al: "Issues regarding MBSFN subframes", 3GPP Draft; R1-074863, 3rd Generation Partnership Project (3GPP), Mobile Competence Centre ; 658, Route Des Lucioles , F-06921 Sophia-Antipolis Cedex; France, vol. RAN WG1, no. Korea; Oct. 30, 2007, XP050108319.

3GPP TS 36.211: "3rd Generation Partnership Project; Technical Specification Group Radio Access Network; Evolved Universal Terrestrial Radio Access (E-UTRA); Physical Channels and Modulation", V8.2.0, Release 8, Mar. 2008, http://www.3gpp.org/ftp/Specs/archive/36_series/36.211/36211-820.zip.

Nokia Corporation, et al., "On Supporting Dynamic MBSFNs and Transmission Mode Switching in MBMS," 3GPP Draft; R2-074849 Dynamic MBSFNS and Mode Switching, 3rd Generation Partnership Project (3GPP), Mobile Competence Centre; 650, Route Des Lucioles; F-06921 Sophia-Antipolis Cedex; France; vol. RAN WG2, No. Jeju, South Korea; 20071105-20071109, Nov. 12, 2007, XP050603358, [Retrieved on Nov. 12, 2007].

* cited by examiner

WIRELESS COMMUNICATION CHANNEL BLANKING

CROSS-REFERENCE TO RELATED APPLICATIONS

This application claims the benefit of U.S. Provisional Patent application Ser. No. 60/988,356 entitled "CONTROL CHANNEL BLANKING" which was filed Nov. 15, 2007. The entirety of the aforementioned application is herein incorporated by reference.

BACKGROUND

I. Field

The following description relates generally to wireless communications, and more particularly to interference over wireless communications channels.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennae can relate to both base stations and mobile devices, in one example, allowing bi-directional communication between the devices on the wireless network. However, such systems can have associated interference as the multiple antennas for the multiple transmitters and multiple receivers can be in communication at the same time. Previous solutions to this interference involve calculating and accounting for an interference level as a mobile device connects to a base station having the highest signal quality in most cases. However, with the advent of other technologies and functionalities, priority of connection points may not be based on the signal quality.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating blanking communications channels of one or more transmitting devices to allow a disparate transmitting device to communicate with a receiver where the blanking transmitting device typically interferes with the disparate transmitting device and receiver. In this regard, a receiving device can communicate with a transmitting device that is not necessarily the transmitting device with the highest signal to noise ratio (SNR). Thus, there can be diversity in the access point to which a receiver communicates.

According to related aspects, a method for mitigating dominant interference in wireless network communications is provided. The method can include determining interference on one or more control channels utilized by a plurality of communicating devices. The method can further include selecting a portion of the one or more control channels on which to blank to diminish the interference and blanking at least a portion of power on the selected portion of the one or more control channels.

Another aspect relates to a wireless communications apparatus. The wireless communications apparatus can include at least one processor configured to blank on one or more control channels of a disparate communication link in a multiple access wireless network to mitigate dominant interference according to information received regarding the interference. The wireless communications apparatus can also include a memory coupled to the at least one processor.

Yet another aspect relates to a wireless communications apparatus that blanks on control channels to mitigate interference thereon. The wireless communications apparatus can include means for determining dominant interference of the wireless communications apparatus for a disparate communication between disparate devices. The wireless communications apparatus can also include means for determining one or more control channels on which to blank to improve quality of the disparate communication as well as means for blanking on the one or more control channels.

Still another aspect relates to a computer program product, which can have a computer-readable medium including code for causing at least one computer to determine interference on one or more control channels utilized by a plurality of communicating devices. The computer-readable medium can further include code for causing the at least one computer to select a portion of the one or more control channels on which to blank to diminish the interference and code for causing the at least one computer to blank at least a portion of power on the selected portion of the one or more control channels.

In accordance with another aspect, an apparatus in a wireless communication system can include a processor configured to determine dominant interference of the wireless communications apparatus for a disparate communication between disparate devices. The processor can also be configured to determine one or more control channels on which to blank to improve quality of the disparate communication and blank on the one or more control channels. Also, the apparatus can include a memory coupled to the processor.

According to a further aspect, a method for requesting blanking over control channels in a wireless communications network is provided. The method can include detecting interference over communication with a device by a dominant interferer on one or more control channels. The method can additionally include requesting blanking on a subset of the one or more control channels from the dominant interferer and transmitting control data to the device on the one or more control channels.

Another aspect relates to a wireless communications apparatus. The wireless communications apparatus can include at least one processor configured to request blanking on one or more control channels from a dominant interferer thereon and transmit control data to a receiving device over the control channels. The wireless communications apparatus can also include a memory coupled to the at least one processor.

Yet another aspect relates to a wireless communications apparatus for requesting blanking on one or more portions of interfered bandwidth. The wireless communications apparatus can comprise means for detecting interference by a dominant interferer over one or more portions of bandwidth. The wireless communications apparatus can further comprise means for requesting blanking from the dominant interferer over the portions of bandwidth as well as means for transmitting data over the portions of bandwidth.

Still another aspect relates to a computer program product, which can have a computer-readable medium including code for causing at least one computer to detect interference over communication with a device by a dominant interferer on one or more control channels as well as code for causing the at least one computer to request blanking on a subset of the one or more control channels from the dominant interferer. The computer-readable medium can further comprise code for causing the at least one computer to transmit control data to the device on the one or more control channels.

In accordance with another aspect, an apparatus can be provided in a wireless communication system including a processor configured to detect interference by a dominant interferer over one or more portions of bandwidth, request blanking from the dominant interferer over the portions of bandwidth, and transmit data over the portions of bandwidth. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
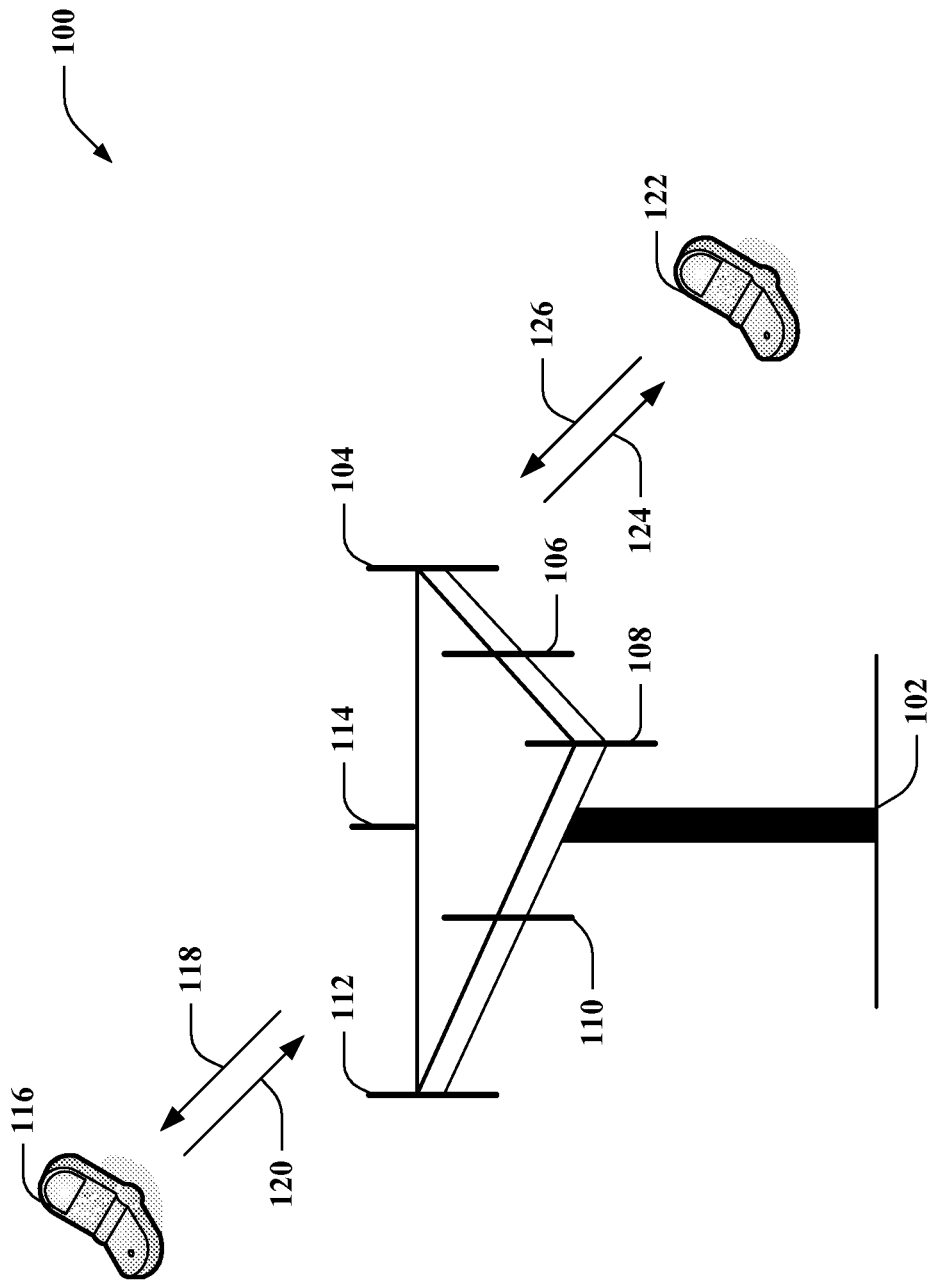
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. The communication channels can comprise one or more logical channels. Such logical channels can be provided for transmitting control data between the mobile devices 116 and 122 and the base station 102 (or from mobile device 116 to mobile device 122 in a peer-to-peer configuration, for example). In an example, the mobile devices 116 and 122 can send channel quality information (CQI) to the base station 102 to indicate parameters regarding an allocated communication channel. Based on the CQI control data, for example, the base station 102 can allocate additional channel resources to the mobile devices 116 and/or 122. Additionally, the base station 102 can send control data to the mobile devices 116 and/or 122, such as acknowledgement information related to receiving data from the devices, over the control channels.

In an example, the base station 102 can blank a portion of channels, meaning it can reduce power utilized to transmit the channels, to allow communication between disparate devices or base stations where the base station 102 is a strong interferer. Thus, devices can connect to access points or base stations based on desire and not necessarily geographical desirability or a maximum signal to noise ratio (SNR). For example, though not shown, mobile device 122 can communicate with a disparate base station that has a lower SNR than base station 102; thus, base station 102 interferes with the communication as it has a better signal for mobile device 122. To allow mobile device 122 to effectively communicate with the disparate base station, base station 102 can blank transmission on certain channels such that the mobile device 122 can utilize those channels to communicate with the disparate base station. It is to be appreciated that the blanking need not entail removing entire power from a channel, though it can. Additionally, the power removed in blanking can be configurable and/or can depend on specific requirements of a communicating device or a measured interference level, for example. It is to be appreciated that in addition or alternative to the base station 102 blanking on control channels of the downlink, the mobile device(s) 116 and/or 122 can blank on control channels of the uplink, for example.

Where the blanking includes reducing power to a channel to allow disparate devices to communicate, devices communicating with the blanking base station 102 (such as mobile device 116) can still receive data over the blanked channels; however the SNR is not as high as regular transmissions (e.g. the communication appears as a deep fade). Additionally, the blanked bandwidth can be compensated by the base station 102 by increasing power utilized to transmit at the non-blanked channels in one example. It is to be appreciated that blanking transmission on resources is not limited to OFDMA configurations; rather this configuration is shown to aid explanation. For example, substantially any wireless communication configuration can utilize the functionality described herein.

Figure 2:
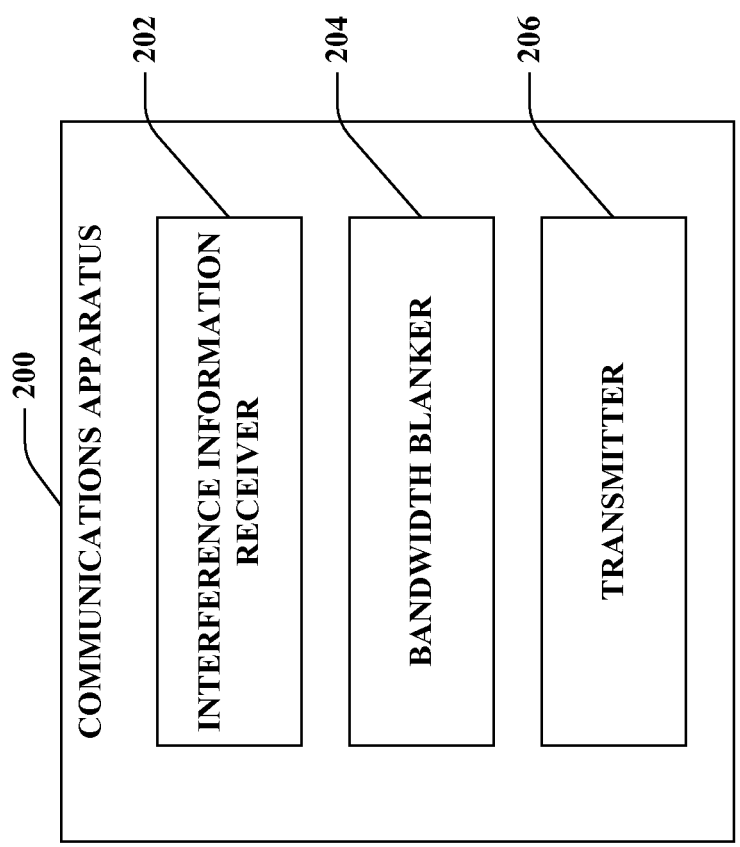
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include an interference information receiver 202 that can receive information related to interference caused by the communications apparatus 200 with other communicating devices, a bandwidth blanker 204 that can blank on certain communications bandwidth portions based at least in part on the interference related information, and a transmitter 206 that can transmit over the communications bandwidth and reduce or increase transmission power based at least in part on the blanking status of the bandwidth portions as determined by the bandwidth blanker 204.

According to an example, the interference information receiver 202 can acquire information relevant to the interference of the communications apparatus 200 with other communications between disparate devices. The information can be discerned or inferred by the communications apparatus 200 and/or provided by one or more disparate devices or components. The information can comprise portions of bandwidth utilized by the disparate devices to communicate with each other; in one example, the portions can be utilized for critical data such as control data. For instance, in an OFDMA wireless network configuration, the information can comprise location of one or more subcarriers utilized as control channels or other channels by the disparate devices in communicating that are interfered by the communications apparatus 200 (e.g., the communications apparatus 200 can be communicating with a disparate device using the relevant bandwidth or channel(s)). The bandwidth blanker 204 can blank on one or more of the channels (or subcarriers thereof) indicated in the received information.

As described, the blanking can include removing substantially all transmit power utilized by the transmitter 206 for the channel or a portion of the power. In another example, the received information can further include an interference level of the communications apparatus 200 such that the bandwidth blanker 204 can reduce power used in transmitting over the blanked channel(s) or bandwidth portions by the transmitter 206, instead of removing all power, and the reduced level can correspond to the interference level received. When the channels are blanked, the disparate devices can achieve desired communications without interference from the communications apparatus 200. It is to be appreciated that the communications apparatus 200, though receiving the interference information via interference information receiver 202, can determine when to blank on channels or other portions of bandwidth. For example, though the interference information receiver 202 may receive information related to certain channels to blank (e.g., in an OFDMA configuration) it does not need to necessarily blank on all channels in each physical frame, and in fact, the bandwidth blanker 204 can choose to blank only in certain physical frames and only on certain control channels or not to blank on anything at all. In one example, the bandwidth blanker 204 can further be utilized to raise transmission power for portions of the bandwidth it is not blanking; in one example, this can account for bandwidth lost during blanking.

According to one example, the communications apparatus 200 can communicate blanking information regarding portions of bandwidth the bandwidth blanker 204 will blank to the one or more disparate communicating devices. In this regard, the devices can rely on the blanking and transmit data (e.g., control data or otherwise) in the portions of bandwidth to ensure reliable communication with one another. In addition, one or more of the disparate devices can blank channels utilized by the communications apparatus 200 in reciprocal form. Thus, the communications apparatus 200 can transmit the blanking information along with portions of bandwidth it would like the disparate device to blank in return. It is to be appreciated that not all components shown are required. For example, the interference information receiver 202 can be optional such that the bandwidth blanker 204 can blank control channels of disparate communications apparatuses. In one example, for a heterogeneous deployment, the bandwidth blanker 204 can blank for control channels of lower powered communications apparatuses.

Figure 3:
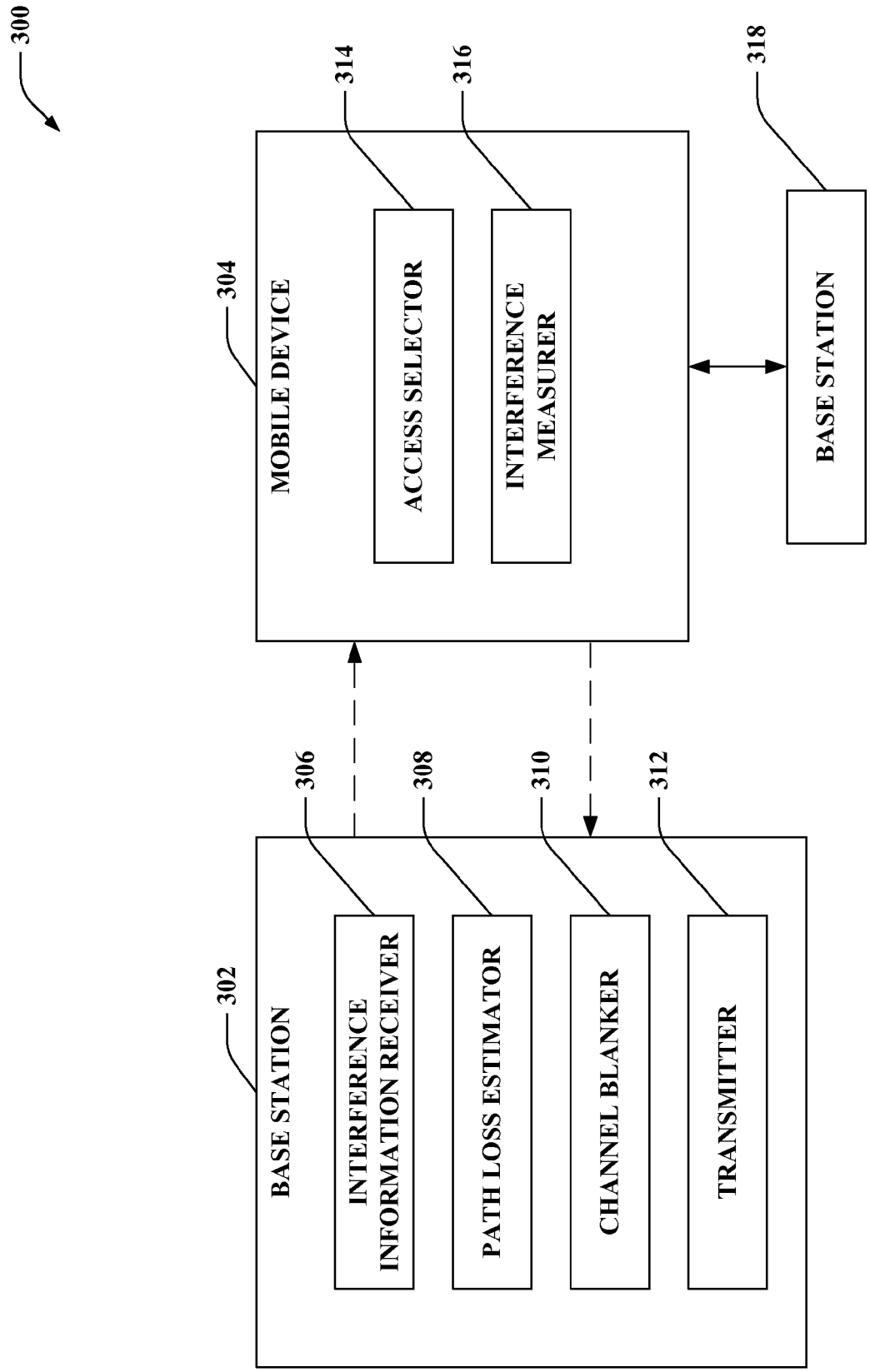
FIG. 3 is an illustration of an example wireless communications system that effectuates blanking and transmitting on otherwise dominantly interfered portions of bandwidth.

Now referring to FIG. 3, illustrated is a wireless communications system 300 that can mitigate dominant interference of one or more devices by blanking on relevant portions of bandwidth. The system 300 includes a base station 302 that can communicate with a plurality of disparate mobile devices (not shown). The mobile device 304 is communicating with base station 318 to facilitate wireless communication service. Base station 318 can transmit information to mobile device 304 over a forward link channel; further base station 318 can receive information from mobile device 304 over a reverse link channel. Moreover, system 300 can be a MIMO system. Additionally, the system 300 can operate in an OFDMA wireless network (such as 3GPP for example). Also, the components and functionalities shown and described below in the base stations 302 and 318 can be present in one another and/or the mobile device 304 as well and vice versa, in one example; the configuration depicted excludes these components for ease of explanation.

Base station 302 includes an interference information receiver 306 that can obtain information related to interference of the base station 302 with other communicating devices (such as mobile device 304 and base station 318), a path loss estimator 308 that can be utilized to determine or otherwise infer an interference level of the base station 302 with respect to other devices, a channel blanker 310 that can blank on channels utilized by the other devices as described above, and a transmitter 312 that transmits data to other devices with which the base station 302 is communicating. In one example, the interference information receiver 306 can receive information related to communications with which the base station 302 is interfering. Additionally or alternatively, the path loss estimator 308 can determine an interference level of the base station 302 based at least in part on an estimated path loss between the base station 302 and a device attempting to communicate over the interference of base station 302 (such as mobile device 304). It is to be appreciated that, in this example, the interference information receiver 306 may not be necessary as the information is discerned from the path loss estimation, for example. Once the information is received, the channel blanker 310 can blank (e.g., remove a portion or substantially all power) on one or more of the channels on which it is interfering. The transmitter 312 can transmit with the assigned power allowing the disparate devices to communicate without (or with substantially less) interference from the base station 302.

Mobile device 304 includes an access selector 314 that can be used to choose an access point for wireless communications and an interference measurer 316 that can determine interference from one or more disparate access points or transmitting devices. According to an example, the mobile device 304 can select a base station or other device, with which to initiate wireless communication, using the access selector 314. In this example, the mobile device 304 can choose to communicate with base station 318. This can be for various reasons such as services provided, protocols utilized, restricted association where the mobile device 304, or a user thereof, may not have authorization to connect to the base station 302 or base station 318, for example, can be in a user home or other area that can offer services or security not easily attainable with base station 302. Additionally, base stations 302 and 318 can be part of a heterogeneously deployed network where the mobile device 304, or a user thereof, may choose to connect to a lower powered base station with lower path-loss but worse SNR, etc. For example, in some cases, it can be desirable for a terminal to be served by a low-transmit power base station having lower path loss even though that base station can have a lower received power and lower SNR. This can be because the low-power base station can serve the mobile device while causing less interference to the network as a whole. Moreover, multiple low-power base stations can simultaneously serve distinct users or mobile devices making much more efficient use of the bandwidth as compared to the high-powered base station serving a single user/device.

It is to be appreciated that the mobile device 304 can additionally choose to communicate with a WiFi hotspot, a disparate mobile device, or substantially any other transmitting entity. Due to proximity and/or transmit strength of the base station 302, interference can occur on the communication link between the mobile device 304 and the base station 318. The interference can be measured by the interference measurer 316 and transmitted to the base station 302 for a blanking request in one example. It is to be appreciated that more than one base station can be a dominant interferer, and thus, blanking requests can be sent to substantially any number of a plurality of interferers.

According to an example, the base station 302 can determine that it is a dominant interferer to the mobile device 304/base station 318 communication. This can be determined, for example, by viewing a preamble transmission and/or pilot transmission of the mobile device 304; using the preamble, a path loss can be estimated by the path loss estimator 308 comprising the ratio of transmit power of the preamble by the mobile device 304 and the quality of the preamble as received by the base station 302. If the path loss is low (e.g., lower than a specified threshold), the base station 302 can be considered a dominant interferer based in part on an implication that the path loss should be worse with respect to communicating with the base station 318. In fact, this information, in one example, can be acquired as well for a more determinative calculation. The information can be acquired through substantially any method and/or device including received from the mobile device 304 (e.g., the mobile device 304 can determine the path loss using a preamble transmitted by the base station 318), received from other components of a wireless communications network (e.g., base station 318 or other network components), and/or the like.

Once base station 302 is determined to be the dominant interferer, in one example, interference information receiver 306 can receive or infer interfered channel locations utilized by the mobile device 304. In one example, the channel locations can be critical channels, such as control channels. The communications apparatus 200 can utilize the channel blanker 310 to blank transmission power used by the transmitter 312 for the relevant channels. The blanking can include removing substantially all power from the transmitter 312 for the given channels and/or simply reducing the power. In this case, the blanking can appear as a deep fade to a disparate device with which the base station 302 is communicating and may not have much of an adverse effect on the communication. Moreover, the power can be reduced at varying degrees as part of the blanking, and in one example, the degrees can be based on the path loss from the path loss estimator 308. For example, where the path loss from the base station 302 to the mobile device 304 is similar to that of the base station 318 and mobile device 304, the degree of blanking may not need to be as substantial as where the path loss for the base station 302 is sufficiently less than that related to the base station 318. Additionally, the base station 302 can increase power used to transmit during channels that are not blanked. As mentioned, it is to be appreciated that the aspects described herein are not limited to channels, but can be utilized with substantially any portion of bandwidth such that the blanking can occur with respect to a relevant portion of the bandwidth. Moreover, the portions of bandwidth blanked can change, in one example, for given time periods.

In another example, blanking can be mutual such that where the base station 302 blanks given channels for mobile device 304, the mobile device 304 can blank on channels utilized by the base station 302 (though the components are not depicted but can be present as mentioned above). Thus, the base station 302 can inform the mobile device 304 that it is blanking control channels on the downlink of the mobile device 304/base station 318 communication; the mobile device 304 can correspondingly blank the uplink control channels related to communication between the base station 302 and a disparate device. This can be desirable, for example, since the path loss can be similar on the uplink and downlink. It is to be appreciated that the information regarding the control channel locations can be exchanged by the base station 302 and the mobile device 304 (and/or the base station 318), inferred from the activity of the receiving device, received from a disparate component of a wireless communications network, set as one or more configuration parameters, and/or the like.

In yet another example, the mobile device 304 can determine an interference level of the base station 302 over relevant channels using the interference measurer 316 and explicitly request the base station 302 blank on the relevant channels. For example, the mobile device 304 can transmit the request to the base station 302 over a dedicated control channel, a data channel, and/or the like. In addition, the mobile device 304 can utilize other components, such as the base station 318, to transmit the request to the base station 302 via over-the-air transmission to the base station 318, using a disparate network component, using a backhaul link between the base station 318 and base station 302 and/or intermediary components, for example. In another example, the base station 302 can receive information related to control channels utilized by the base station 318 from other mobile devices roaming throughout the area.

The blanking request can relate to certain channels, portions of bandwidth (e.g., subcarriers) over a specified time period, etc. The blanking request can also comprise a repetition factor over time or other bandwidth measurements, such as one or more frames or OFDM symbols, in one example. Additionally or alternatively, the mobile device 304 can transmit the request for blanking at each instance it desires blanking to occur. It is to be appreciated that the base station 302 need not grant the request, or can grant a portion of the request. Indeed, the base station 302 can also receive information regarding activity intervals for a mobile device 304 that is not in a fully active state and only blank at intervals where the mobile device 304 is active. In addition, for example, the base station 302 can transmit the determined blanking scheme to the mobile device 304 so the mobile device 304 can advantageously use the information to ensure reliable communication with the base station 318. It is to be appreciated that the blanking information can be transmitted using one or more of the techniques described for transmitting the request for blanking. Additionally, the base station 302 can increase power for transmissions where blanking is not requested. It is to be appreciated that the described functionalities can be implemented for uplink channels as well where the base station 302 can comprise the components shown in the mobile device 304 and vice versa. In this regard, the base station 302 can request that the mobile device 304 blank on its uplink control channels, and the mobile device 304 can grant the request over a portion of subcarriers. Additionally, not all components listed are required to implement functionalities described; as shown supra, the interference information receiver 306 is not necessary in all deployments.

Figure 4:
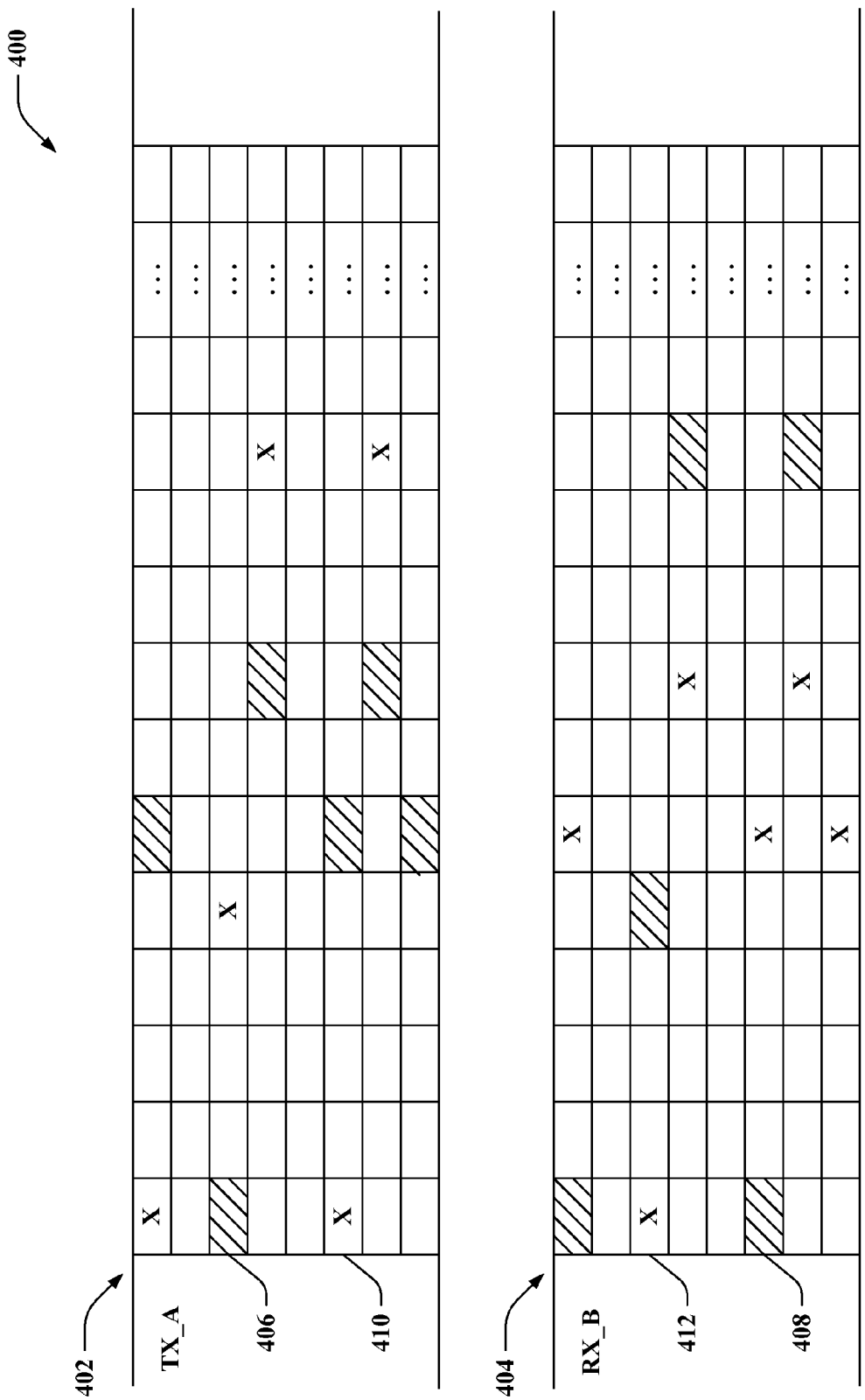
FIG. 4 is an illustration of example bandwidth for devices that interfere with one another.

Now referring to FIG. 4, example portions of bandwidth are shown for a transmitter and receiver in communication with disparate devices. At 402, a portion of bandwidth for a transmitter TX_A is shown, and at 404, a portion of bandwidth over substantially the same time and frequency for receiver RX_B is shown. In one example, the portions can represent OFDM symbols of substantially the same time and frequency. Channels utilized by TX_A and RX_B to communicate with their respective disparate devices can be represented as substantially any subcarriers of the OFDM symbols; lined subcarriers such as 406 and 408 can represent those for which blanking is desired (the subcarriers comprise one or more control channels in one example), and subcarriers having an "X" such as 410 and 412 can represent blanked subcarriers.

In one example, as described previously, TX_A can be communicating data with a disparate receiver, RX_A, and RX_B can be communicating with a disparate transmitter TX_B. As mentioned, however, TX_A can be dominantly interfering with RX_B's communication with TX_B. Thus, using one or more of the techniques described above, RX_B can request that TX_A blank on the desired subcarriers (or channels which can be represented by a number of subcarriers) or vice versa. It is to be appreciated that RX_B and TX_A can reciprocally blank on their desired subcarriers. As depicted, TX_A can request RX_B to blank on subcarrier 406, which it does at 412 and RX_B can request TX_A to blank on subcarrier 408, which it does at 410, and so on. In this regard, TX_A and RX_B can communicate with their respective disparate devices without interfering with one another. Additionally, as mentioned, the subcarriers on which no blanking occurs can be transmitted with higher power to compensate for loss in bandwidth due to the blanking in one example. Moreover, the blanking can include removing substantially all power from the subcarrier or reducing the power according to a determined interference level as described supra.

Figure 5:
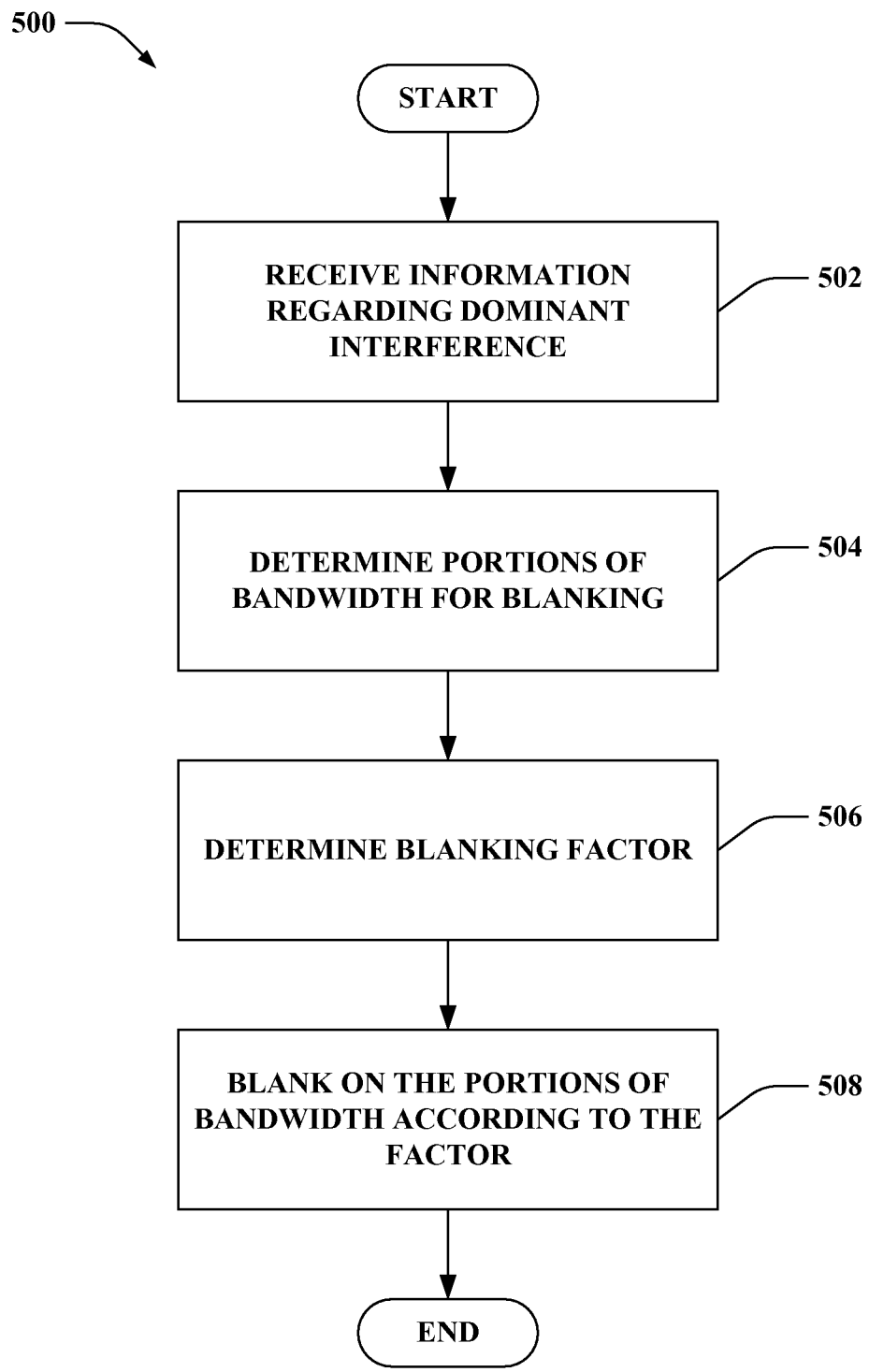
FIG. 5 is an illustration of an example methodology that facilitates blanking on one or more portions of bandwidth.
Figure 6:
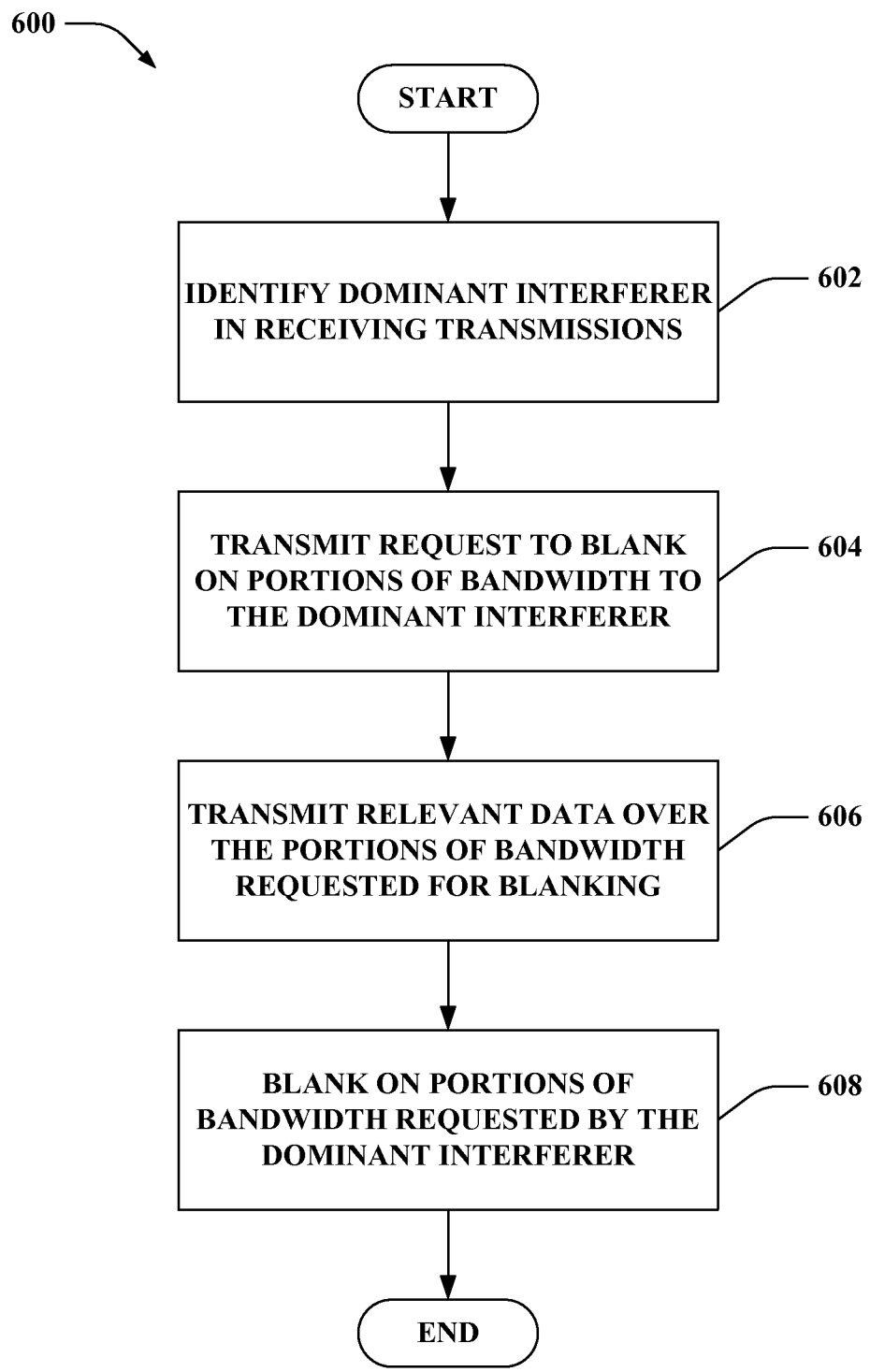
FIG. 6 is an illustration of an example methodology that facilitates requesting blanking over one or more portions of bandwidth.

Referring to FIGS. 5-6, methodologies relating to blanking on portions of bandwidth that are interfered are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates blanking on portions of bandwidth to mitigate interference in communications between disparate devices. At 502, information is received regarding dominant interference. For example, the information can be received by a number of devices or inferred based on numerous factors, including transmitted preambles as described previously. The information can comprise portions of bandwidth on which dominant interference occurs such that disparate devices cannot effectively communicate with one another. At 504, portions of bandwidth can be determined for blanking. For example, the portions can be requested from disparate devices as part of the information regarding dominant interference; the determined portions can be a subset of those requested. In one example, the requested portions can be specified as one or more portions for every given time period (such as a frame or OFDM symbol), and the determined portions can be over a subset of the time periods. Additionally or alternatively, the portions for blanking can be inferred from the dominant interference information.

At 506, a blanking factor can be determined; the blanking factor represents the extent to which power is to be removed from the blanked portions. For example, the blanking factor can indicate that substantially all power is to be removed from the portions of bandwidth; alternatively, a portion of the power can be removed. In one example, as described previously, information can be received or inferred regarding an interference level. Using this information, the blanking factor can be set to allow the interfered devices to effectively communicate without removing all power during blanking. At 508, the portions of bandwidth can be blanked according to the determined factor. It is to be appreciated that the blanking, in some cases, can be received as a deep fade rather than no signal. In this regard, the blanked communications can still be important though the SNR is not as good as other transmissions.

Now referring to FIG. 6, a methodology 600 that facilitates requesting blanking on portions of bandwidth from a dominant interferer is illustrated. At 602, a dominant interferer in receiving transmissions is identified. For example, communications can occur with an access point that may not be the most geographically desirable or have the most desirable SNR as compared to other access points. However, communication can be desired with the access point to utilize services associated therewith, for example. Thus, there can be a device (e.g. that with optimal SNR or geographical desirability) dominantly interfering with communications. At 604, a request is transmitted to the dominant interferer to blank on certain portions of bandwidth. As described, the portions can be logical communications channels, in one example, such as one or more OFDM symbols. By requesting the blanking, more reliable communication can be attained over the portions of bandwidth.

At 606, relevant data can be transmitted over the portions of bandwidth requested for blanking. In one example, the relevant data can be data that is critical to effective communication such as control data (e.g., channel quality information and/or acknowledgement data). Assuming that the request for blanking was successful and the dominant interferer has lowered power for the requested portions of data, the relevant data can be communicated without substantial interference. At 608, portions of bandwidth can be blanked as requested by the dominant interferer to reciprocate the blanking by the dominant interferer. In this regard, the dominant interferer can additionally enjoy lowered interference on certain portions of bandwidth or channels for effective communication with one or more devices.

It will be appreciated that, in accordance with one or more aspects described herein, inferences can be made regarding detecting interference by an interfered device and/or from the dominant interferer as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic— that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to being a dominant interferer, the extent to which the interference is prohibiting communication between disparate devices, portions of bandwidth to blank based on activity of an interfered device, determining a blanking factor, determining channels on which power can be increased to compensate for the blanking, likelihood of reciprocal blanking from one or more devices, and/or the like.

Figure 7:
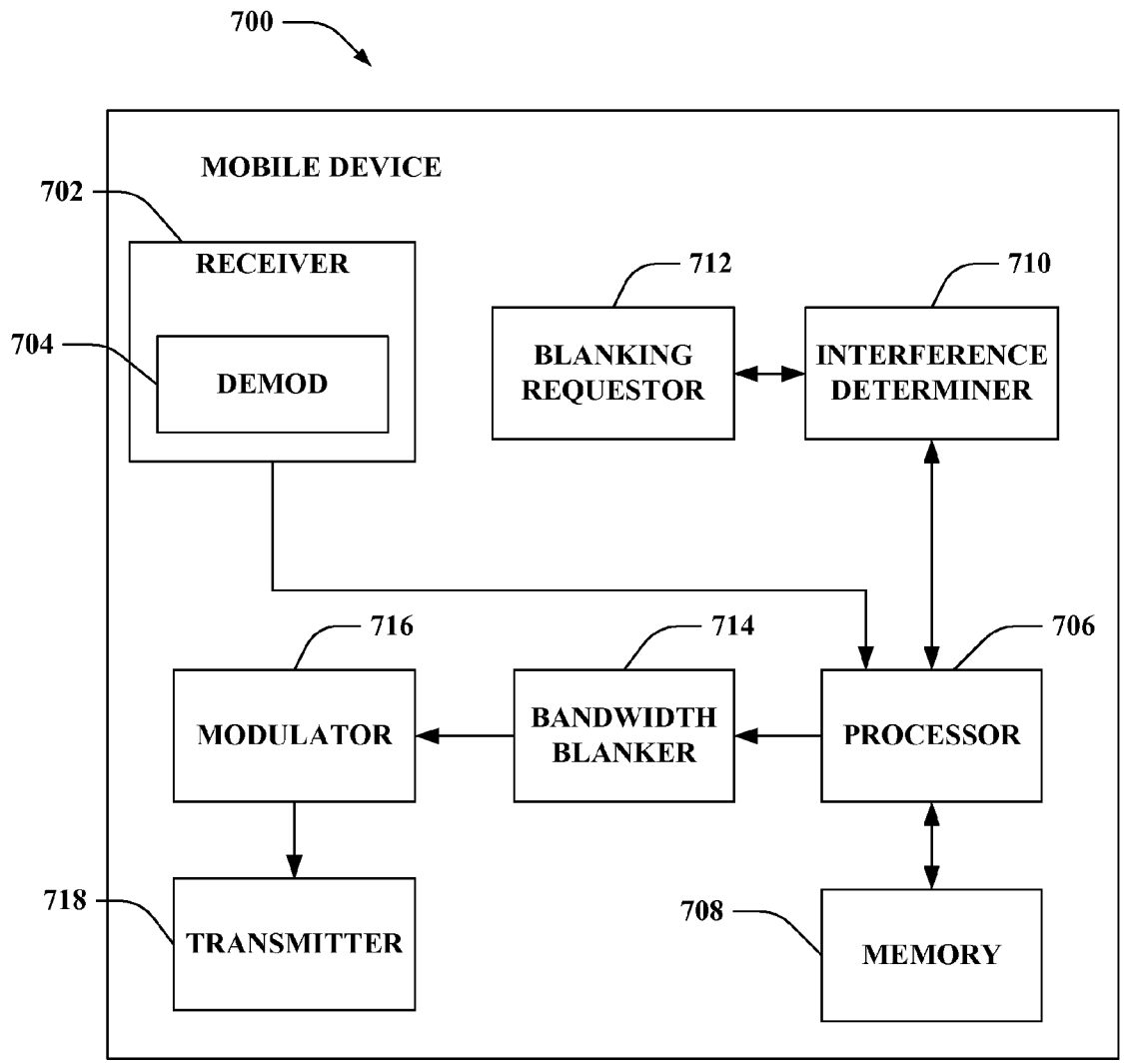
FIG. 7 is an illustration of an example mobile device that facilitates requesting blanking on one or more portions of bandwidth.

FIG. 7 is an illustration of a mobile device 700 that facilitates requesting blanking on highly interfered portions of bandwidth and reciprocally blanking bandwidth for the dominant interferer. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 718, a processor that controls one or more components of mobile device 700, and/or a processor that both analyzes information received by receiver 702, generates information for transmission by transmitter 718, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to an interference determiner 710 that can detect the presence and/or extent of interference of communication with an access point by one or more disparate devices or access points. The detected interference can prevent the mobile device 700 from effectively transmitting certain relevant communication data, such as control data, to a disparate device or access point. A blanking requestor 712 can also be operatively coupled to the processor 706 and can be utilized to transmit requests to one or more interfering devices requesting blanking on portions of bandwidth desired by the mobile device 700 to transmit the relevant communication data. If the blanking request is satisfied, the mobile device 700 can transmit the relevant data over the bandwidth without interference from a dominantly interfering device.

Additionally, the processor 706 can be operatively coupled to a bandwidth blanker 714 that can blank on bandwidth as requested by one or more disparate devices. This can occur, for example, where the mobile device 700 is a dominant interferer to communication between disparate devices. Moreover, the bandwidth blanker 714 can be used to reciprocally blank bandwidth for the dominant interferer to communicate relevant data to one or more disparate devices. Mobile device 700 still further comprises a modulator 716 and transmitter 718 that respectively modulate and transmit signals to, for instance, a base station, another mobile device, etc. Although depicted as being separate from the processor 706, it is to be appreciated that the interference determiner 710, blanking requester 712, bandwidth blanker 714, demodulator 704, and/or modulator 716 can be part of the processor 706 or multiple processors (not shown).

Figure 8:
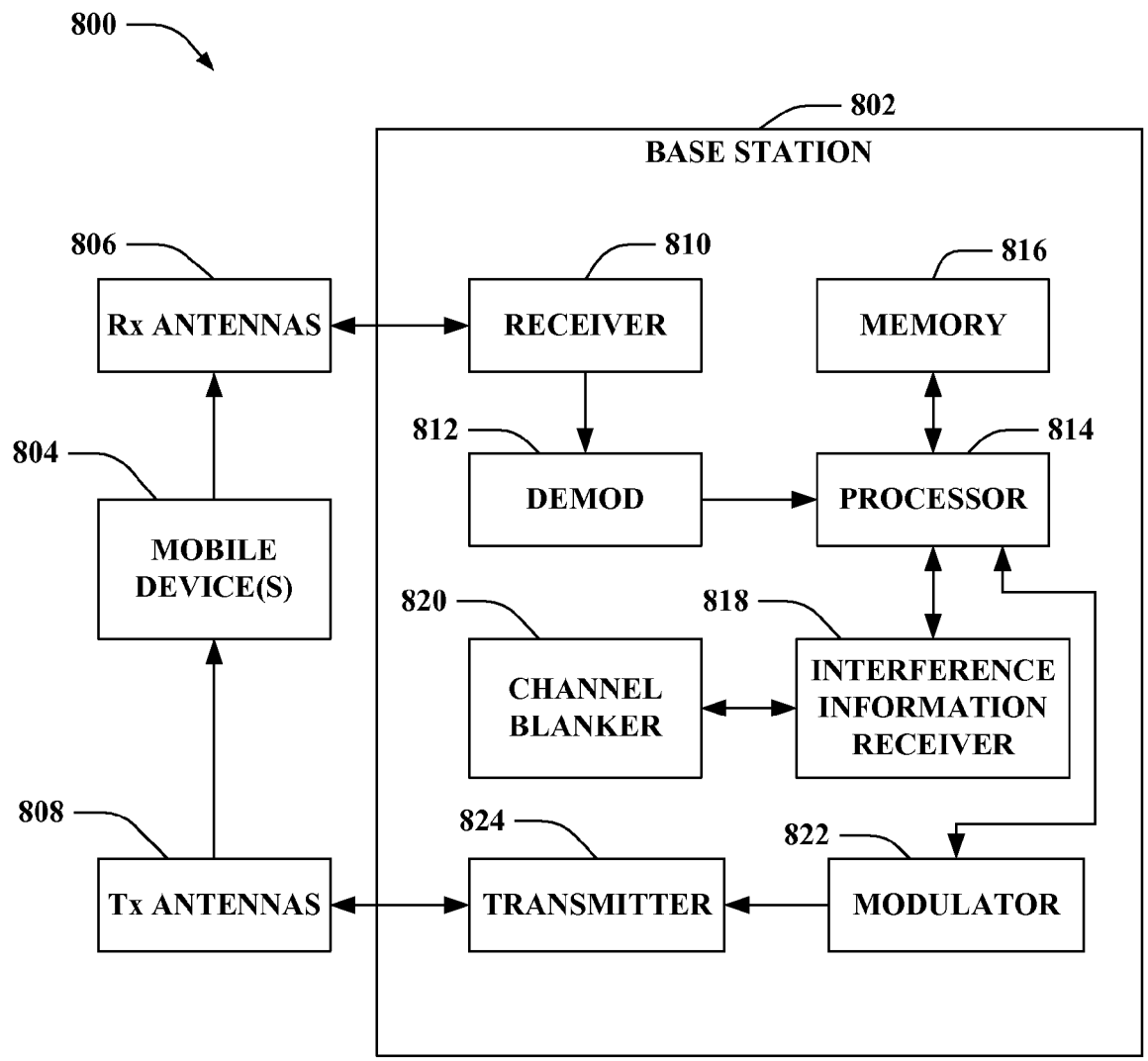
FIG. 8 is an illustration of an example system that facilitates blanking on one or more portions of bandwidth.

FIG. 8 is an illustration of a system 800 that facilitates blanking on portions of bandwidth to mitigate dominant interference on communications between disparate devices. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to an interference information receiver 818 that can receive information related to interference of the base station 802 with communications of one or more devices (such as mobile devices 804) and a channel blanker 820 that can blank portions of bandwidth (such as one or more channels made up of one or more subcarriers) to allow the interfered device to transmit desired data.

For instance, the interference information receiver 818 can determine existence of interference from the base station 802 by receiving explicit information (or blanking requests) or inferring such, for example, by estimating path loss from a preamble transmitted by one or more devices (e.g., mobile devices 804). The interference information receiver 818 can also receive or infer information related to specific portions of bandwidth for which the interference is more problematic than others. Using this information, the channel blanker 820 can blank transmission power on one or more channels to reduce the effect of the interference on disparate communications between disparate devices (e.g., mobile devices 804 and/or other devices). The channel blanker 820 can blank by at least one of removing substantially all power from the transmitter 824 for a specified channel or related subcarrier(s) and/or by reducing power sufficiently to allow the communication between the disparate devices. Furthermore, although depicted as being separate from the processor 814, it is to be appreciated that the interference information receiver 818, channel blanker 820, demodulator 812, and/or modulator 822 can be part of the processor 814 or multiple processors (not shown).

Figure 9:
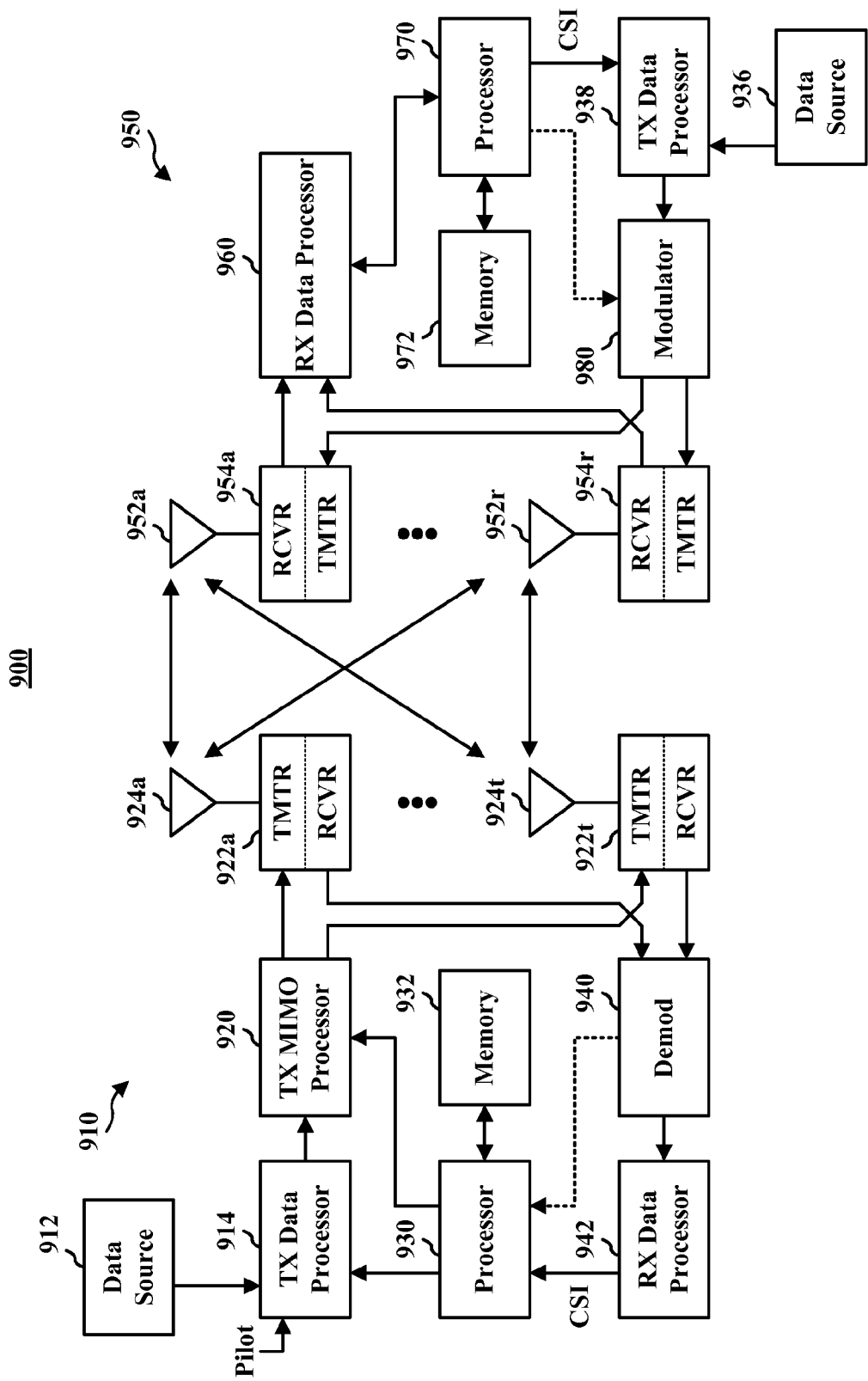
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
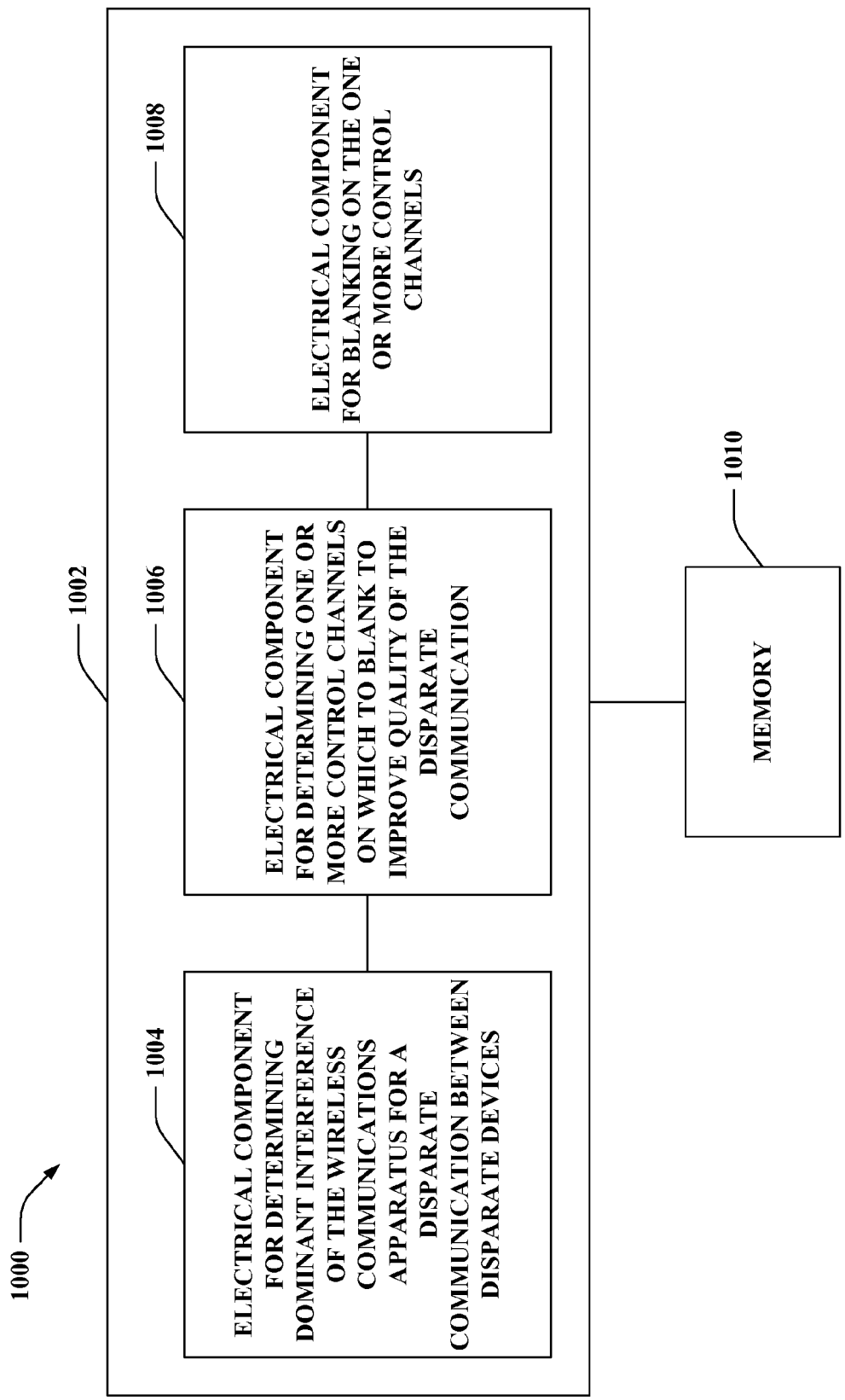
FIG. 10 is an illustration of an example system that blanks on one or more portions of bandwidth.

With reference to FIG. 10, illustrated is a system 1000 that blanks on one or more portions of bandwidth to mitigate dominant interference thereon. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for determining dominant interference of the wireless communications apparatus for a disparate communication between disparate devices 1004. For example, the interference can be determined by receiving information related thereto, discerning the interference, which can be based at least in part on measuring a path loss from a preamble of one or more of the disparate devices, and the like. Additionally, a level of interference can be measured to allow for partial blanking on one or more portions of bandwidth. Further, logical grouping 1002 can comprise an electrical component for determining one or more control channels on which to blank to improve quality of the disparate communication 1006. In one example, the control channels can be defined by a number of subcarriers of one or more OFDM symbols used for communication. By blanking on the portions, the devices that are being interfered can ensure quality transmission with each other since the dominant interferer is no longer interfering on the portions. Moreover, logical grouping 1002 can comprise an electrical component for blanking on the one or more control channels 1008. Thus, the channels can actually be blanked to facilitate reliable communication between the devices over the portions of bandwidth that make up the control channels. Additionally, system 1000 can include a memory 1010 that retains instructions for executing functions associated with electrical components 1004, 1006, and 1008.

While shown as being external to memory 1010, it is to be understood that one or more of electrical components 1004, 1006, and 1008 can exist within memory 1010.

Figure 11:
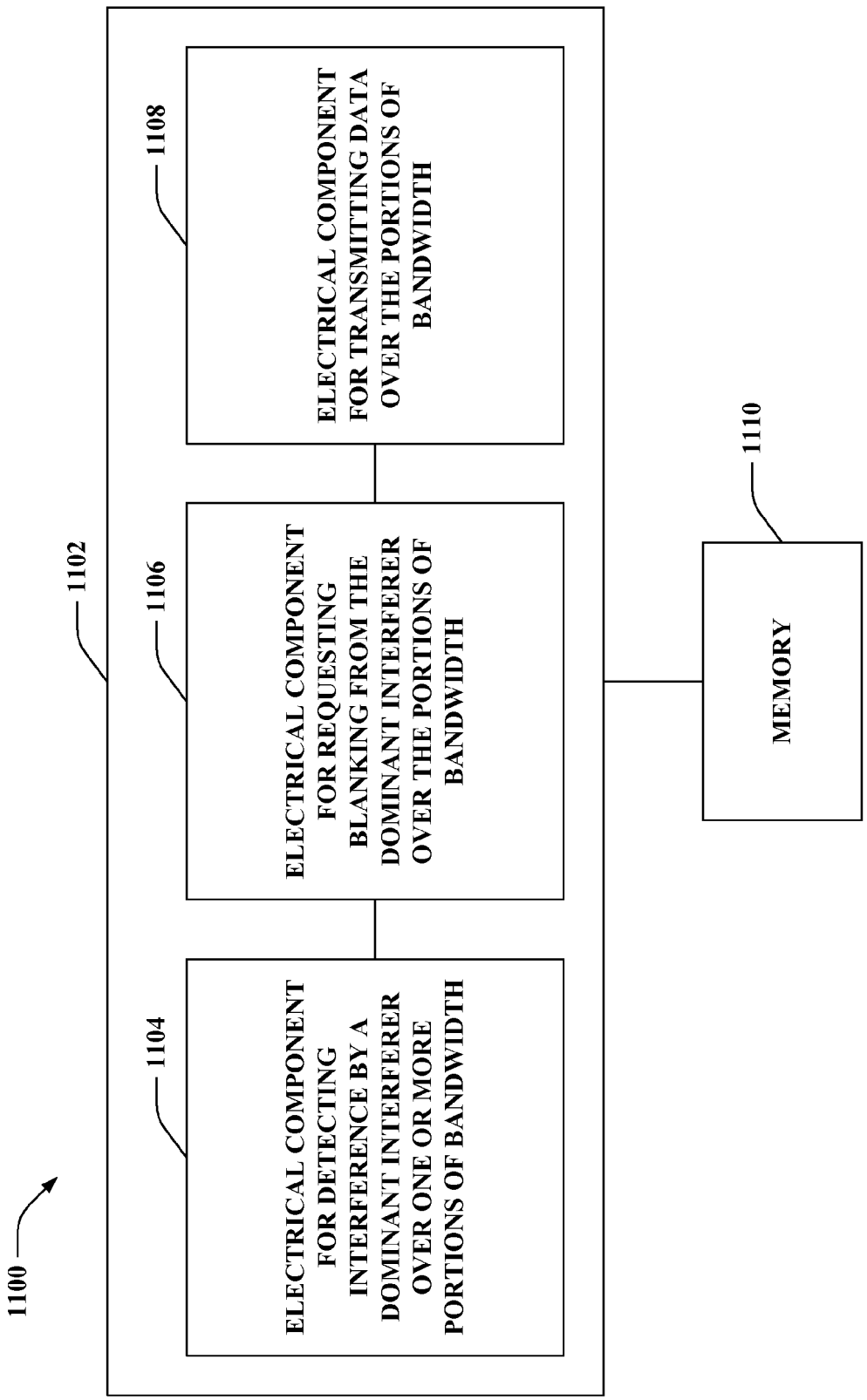
FIG. 11 is an illustration of an example system that requests blanking and transmits data over portions of bandwidth.

Turning to FIG. 11, illustrated is a system 1100 that requests blanking on one or more portions of bandwidth to allow non-interfered transmission of data over the portions of bandwidth. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate requesting the blanking and transmitting data. Logical grouping 1102 can include an electrical component for detecting interference by a dominant interferer over one or more portions of bandwidth 1104. The interference can be detected based on an SNR, control data, etc., and the portions of bandwidth can be those used for transmitting critical data, such as control data, for example. Moreover, logical grouping 1102 can include an electrical component for requesting blanking from the dominant interferer over the portions of bandwidth 1106. In this regard, if the blanking request is granted (in part or in full), there can be less interference over the portions of bandwidth such to improve quality of transmission over the portions. Further, logical grouping 1102 can comprise an electrical component for transmitting data over the portions of bandwidth 1108. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for mitigating dominant interference in wireless network communications, comprising:
    determining dominant interference on one or more control channels utilized by a plurality of communicating devices;
    selecting a portion of the one or more control channels on which to blank to diminish the interference; and
    blanking at least a portion of power on the selected portion of the one or more control channels.

2. The method of claim 1, further comprising receiving an indication of a level of interference, the portion of power blanked is related to the level of interference.

3. The method of claim 1, further comprising receiving an indication of interference caused on the one or more control channels utilized by the plurality of communicating devices.

4. The method of claim 3, further comprising transmitting information regarding portions of bandwidth interfered by at least one of the communicating devices to the communicating device to request blanking thereof by the communicating device.

5. The method of claim 3, further comprising receiving a preamble from at least one of the communicating devices, the indication of interference is received from an inference related to estimating a path loss of the device based at least in part on the preamble.

6. The method of claim 3, the indication of interference is received from one or more of the plurality of communicating devices.

7. The method of claim 1, further comprising receiving information regarding a subset of the one or more control channels on which blanking is desired from at least one of the communicating devices.

8. The method of claim 1, further comprising transmitting at a higher power on disparate portions of bandwidth to compensate for the blanking.

9. The method of claim 1, wherein the blanking step is performed by a base station.

10. A wireless communications apparatus, comprising:
at least one processor configured to blank on one or more control channels of a disparate communication link in a multiple access wireless network to mitigate dominant interference according to information received regarding the dominant interference on the one or more control channels utilized by a plurality of communicating devices, the dominant interference being determined by at least one communications device; and
a memory coupled to the at least one processor.

11. The wireless communications apparatus of claim 10, the at least one processor further configured to determine a blanking factor by which to blank on the one or more control channels.

12. The wireless communications apparatus of claim 11, the at least one processor further configured to estimate a path loss based at least in part on a preamble received from an interfered device, the blank factor is determined based at least in part on the estimated path loss.

13. The wireless communications apparatus of claim 10, the information is received from a dominantly interfered device of the disparate communication requesting the blanking.

14. The wireless communications apparatus of claim 13, the at least one processor further configured to reciprocally request channel blanking from the dominantly interfered device.

15. The wireless communications apparatus of claim 10, the blanking performed over a subset of the control channels of the disparate communication in a set of frames, each frame comprising a plurality of OFDM symbols.

16. The wireless communications apparatus of claim 10, the at least one processor further configured to transmit with greater power on unblanked channels to compensate for loss occurring due to the channel blanking.

17. The wireless communications apparatus of claim 10, wherein the wireless communications apparatus is integrated with a base station.

18. A wireless communications apparatus that blanks on control channels to mitigate interference thereon, comprising:
means for determining dominant interference on one or more control channels of the wireless communications apparatus for a disparate communication between disparate devices;
means for determining which ones of the one or more control channels on which to blank to improve quality of the disparate communication; and
means for blanking on the one or more control channels.

19. The wireless communications apparatus of claim 18, further comprising means for determining a level of interference of the wireless communications apparatus, the level is utilized by the means for blanking.

20. The wireless communications apparatus of claim 18, the control channels on which to blank are determined based at least in part on information received from at least one of the disparate devices.

21. The wireless communications apparatus of claim 18, the control channels repeat over one or more contiguous frames of bandwidth.

22. The wireless communications apparatus of claim 21, the blanking is performed over a subset of the one or more contiguous frames of bandwidth.

23. The wireless communications apparatus of claim 18, further comprising means for requesting reciprocal blanking from at least one of the disparate devices.

24. The wireless communications apparatus of claim 18, wherein the wireless communications apparatus is integrated with a base station.

25. A non-transitory computer program product, comprising:
a computer-readable medium comprising:
code for causing at least one computer to determine dominant interference on one or more control channels utilized by a plurality of communicating devices;
code for causing the at least one computer to select a portion of the one or more control channels on which to blank to diminish the interference; and
code for causing the at least one computer to blank at least a portion of power on the selected portion of the one or more control channels.

26. The computer program product of claim 25, further comprising code for causing the at least one computer to receive an indication of a level of interference, the portion of power blanked is related to the level of interference.

27. The computer program product of claim 25, wherein the computer program product is integrated with a base station.

28. A wireless communication apparatus, comprising:
a processor configured to:
determine dominant interference of the wireless communications apparatus on one or more control channels for a disparate communication between disparate devices;
determine which ones of the one or more control channels on which to blank to improve quality of the disparate communication; and
blank on the one or more control channels; and
a memory coupled to the processor.

29. The wireless communication apparatus of claim 28, wherein the wireless communication apparatus is integrated with a base station.

30. A method for requesting blanking over control channels in a wireless communications network, comprising:
detecting dominant interference over communication with a device by a dominant interferer on one or more control channels, the dominant interference being determined by at least one communications device;
requesting blanking on a subset of the one or more control channels from the dominant interferer; and
transmitting control data to the device on the subset of the one or more control channels.

31. The method of claim 30, further comprising receiving an indication of control channels to be blanked by the dominant interferer.

32. The method of claim 30, further comprising receiving a request to blank on one or more control channels of the dominant interferer.

33. The method of claim 32, further comprising blanking on a portion of the requested control channels.

34. The method of claim 30, further comprising leveraging a network component to request the blanking.

35. The method of claim 30, wherein the requesting step is performed by a mobile station.

36. The method of claim 30, wherein the dominant interferer corresponds to a mobile station served by the same base station or access point as (i) the device, or (ii) a target of the transmitted control data.

37. A wireless communications apparatus, comprising:
- at least one processor configured to detect dominant interference by a dominant interferer over one or more control channels, the dominant interference being determined by at least one communications device, to request blanking on the control channels by the dominant interferer thereon, and to transmit control data to a receiving device over the control channels; and
- a memory coupled to the at least one processor.

38. The wireless communications apparatus of claim 37, the at least one processor further configured to determine one or more channels on which the dominant interferer is blanking.

39. The wireless communications apparatus of claim 37, the at least one processor further configured to receive a request from the dominant interferer to reciprocally blank on one or more control channels thereof.

40. The wireless communications apparatus of claim 39, the at least one processor further configured to blank on one or more control channels of the dominant interferer according to the request.

41. The wireless communications apparatus of claim 37, the at least one processor further configured to utilize the receiving device to transmit the blanking request to the dominant interferer.

42. The wireless communications apparatus of claim 37 wherein the wireless communications apparatus is integrated with a mobile station.

43. A wireless communications apparatus for requesting blanking on one or more portions of interfered bandwidth, comprising:
- means for detecting dominant interference by a dominant interferer over one or more portions of bandwidth, the dominant interference being determined by at least one communications device;
- means for requesting blanking from the dominant interferer over the portions of bandwidth; and
- means for transmitting data over the portions of bandwidth.

44. The wireless communications apparatus of claim 43, further comprising means for receiving information regarding one or more portions of bandwidth the dominant interferer is blanking.

45. The wireless communications apparatus of claim 43, further comprising means for receiving a request from the dominant interferer regarding reciprocally blanking a portion of bandwidth for the dominant interferer.

46. The wireless communications apparatus of claim 43, further comprising means for blanking on at least a subset of the portion of bandwidth requested by the dominant interferer.

47. The wireless communications apparatus of claim 43, the request for blanking is transmitted to the dominant interferer by one or more disparate devices.

48. The wireless communications apparatus of claim 43, wherein the wireless communications apparatus is integrated with a mobile station.

49. A non-transitory computer program product, comprising:
- a computer-readable medium comprising:
  - code for causing at least one computer to detect dominant interference over communication with a device by a dominant interferer on one or more control channels, the dominant interference being determined by at least one communications device;
  - code for causing the at least one computer to request blanking on a subset of the one or more control channels from the dominant interferer; and
  - code for causing the at least one computer to transmit control data to the device on the subset of the one or more control channels.

50. The computer program product of claim 49, further comprising code for causing the at least one computer to receive an indication of control channels to be blanked by the dominant interferer.

51. The computer program product of claim 49, wherein the computer program product is integrated with a mobile station.

52. A wireless communication apparatus, comprising:
- a processor configured to:
  - detect dominant interference by a dominant interferer over one or more portions of bandwidth, the dominant interference being determined by at least one communications device;
  - request blanking from the dominant interferer over the portions of bandwidth; and
  - transmit data over the portions of bandwidth; and a memory coupled to the processor.

53. The wireless communication apparatus of claim 52, wherein the wireless communication apparatus is integrated with a mobile station.

* * * * *